Figure 1:
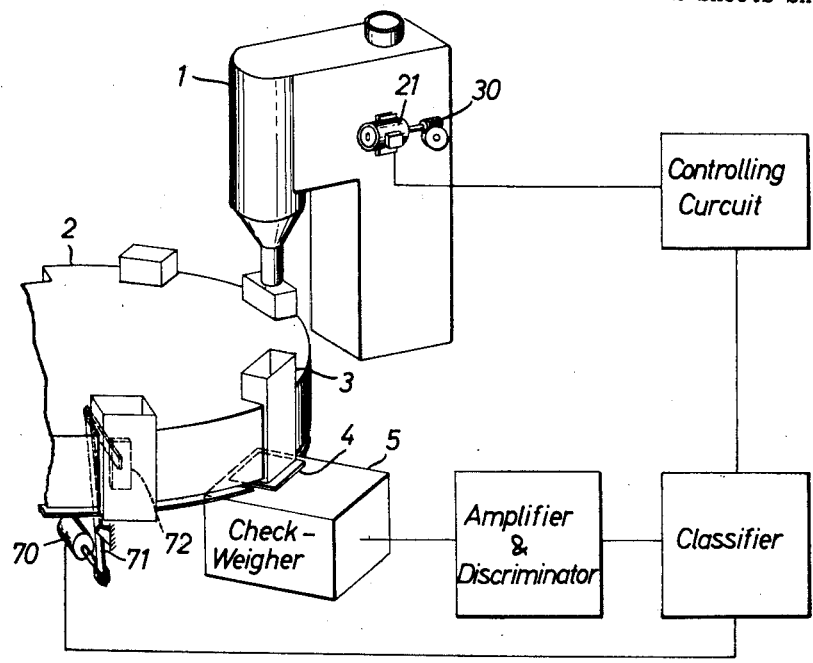

Jan. 15, 1963

U. BAUDER ETAL 3,073,400

VOLUMETRIC FILLING MACHINE

Filed July 13, 1960

2 Sheets-Sheet 1

Jan. 15, 1963 U. BAUDER ETAL 3,073,400
VOLUMETRIC FILLING MACHINE
Filed July 13, 1960 2 Sheets-Sheet 2

3,073,400
VOLUMETRIC FILLING MACHINE
Ulrich Bauder, Stuttgart, and Kurt Braun, Esslingen (Neckar), Germany, assignors to Firma Fr. Hesser Maschinenfabrik-Aktiengesellschaft, Stuttgart-Bad Cannstatt, Germany, a corporation of Germany
Filed July 13, 1960, Ser. No. 42,715
Claims priority, application Germany July 16, 1959
5 Claims. (Cl. 177—56)

Our invention relates to volumetric filling machines having means for maintaining the charge weights constant. In particular, the invention relates to machines of this character in which individual packaging containers, after being filled, are successively checked in weight by means of a gauging mechanism, and the volumes delivered by the machine are automatically adjusted on the basis of any underweights or overweights which are detected.

Volumetric filling machines for dispensing bulk materials into containers are well known in the art, and many known machines are of an adjustable character so that the amount of material to be delivered may be varied within certain limits. One form of measuring mechanism shown in Palmer Patents Nos. 2,309,209 and 2,503,295 is provided with adjustable chambers and means for automatically effecting adjustment of these chambers, so that the volumetrically measured quantities are of determined weight.

In another type of volumetric filling devices shown in Craig Patent No. 2,643,026, the containers are filled with material by a feed screw, an auger or other feeding means, which for dispensing determined weight are controlled by time or by the number of revolutions. This dispensing device is also adjustable in known manner to achieve correct weights.

In a known apparatus, the dispensed volume is only adjusted after a series, for example two or more, filled containers are found to exhibit an underweight or an overweight. The underweight or overweight packages produce electrical impulses in the weighing apparatus, and these are fed to separate underweight and overweight counters. When a sum, which can be preset, of either positive or negative impulses is reached, this brings about an increase or reduction in the dispensing volume. This apparatus is, however, so operated that the impulses which have previously been fed thereto are completely erased if a package with the intended weight reaches the weighing apparatus following individual packages, or a series of packages, of faulty weight but smaller in number than is necessary to provoke an adjustment. This apparatus has the drawback that a tendency to underweight or overweight is not corrected, as it really should be, if faulty regulations of the charging machine, caused by so-called "strays," are to be positively avoided.

To preclude this shortcoming, the apparatus according to the present invention comprises a counter mechanism which can be affected in two directions and is adapted to sum the negative and positive weight impulses, corresponding to underweights and overweights respectively, and when a predetermined, selectable sum of positive or negative impulses is reached, to initiate a corresponding correction of the dispensing volume of the charging machine.

The result secured by the apparatus according to the present invention is that impulses occasioned by so-called "strays" are automatically excluded and a correction is only made when there is a continuing tendency to minus or plus weights.

Figure 2:
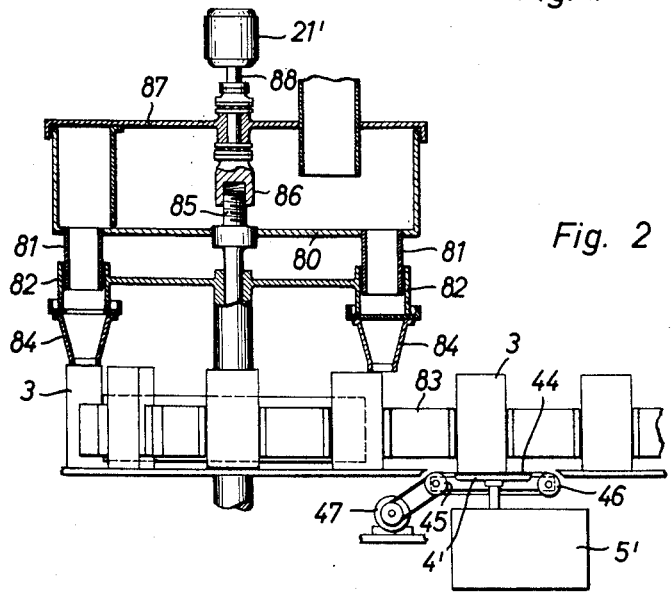
Figure 3:
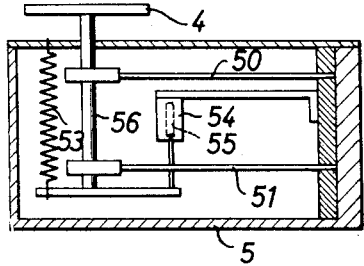
Figure 4:
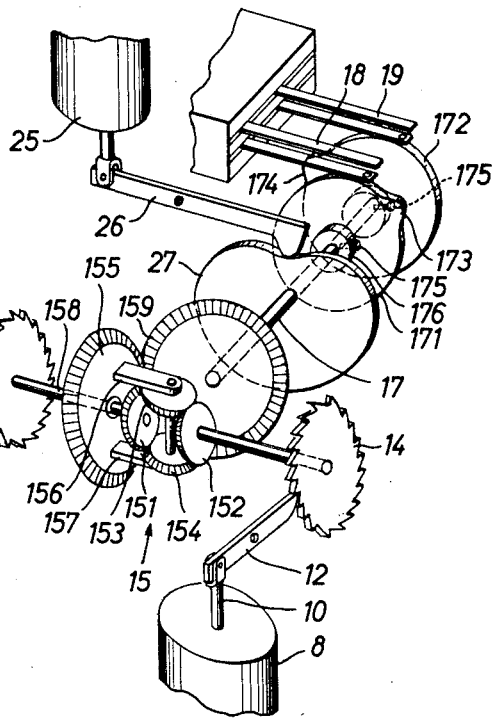
Figure 5:
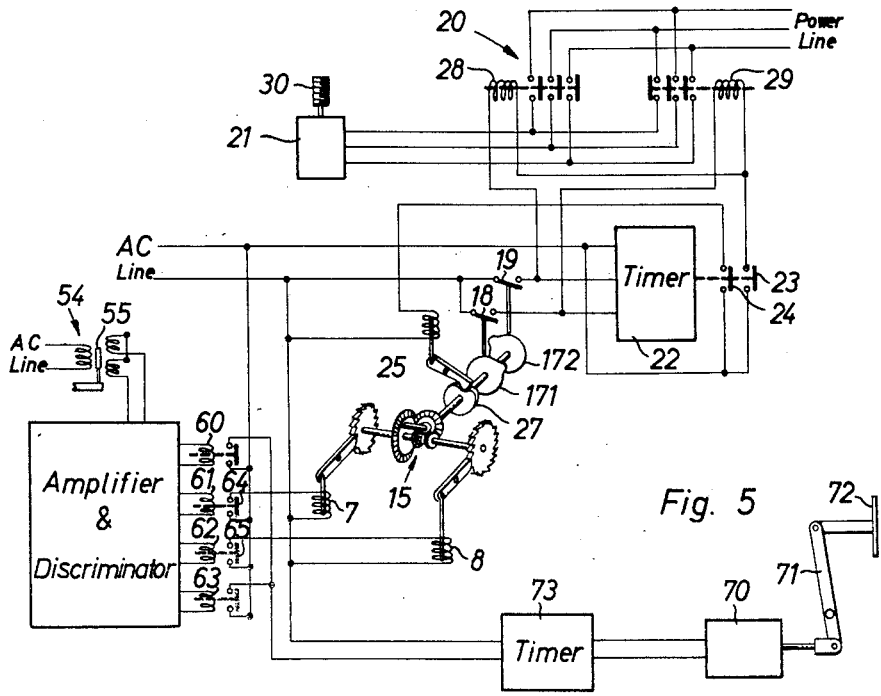

Two embodiments of the invention are diagrammatically illustrated in the accompanying drawings, in which:
FIGURE 1 shows diagrammatically a worm-type volumetric filling machine with an electric device for checking the weight of the filled packages and an adjusting device,
FIGURE 2 is a side elevation, partly in section, of a measuring and dispensing machine provided with a belt check weigher,
FIGURE 3 is a sectional view of the electric check weigher schematically illustrated in FIG. 1,
FIGURE 4 is a perspective view of an indexing mechanism, and
FIGURE 5 shows a wiring diagram.

Referring now to the drawings and more particularly to the embodiment shown in FIG. 1, it may be seen that the quantities of charging material are measured out by means of a known kind of adjustable worm dispensing machine 1 which, for example, may be of the type described in the U.S. Patent No. 2,643,026 issued to Craig. The gauged quantities of material are then filled into packages 3 which by means of an intermittently rotating conveyor wheel 2 of well-known construction are fed to a packaging machine of known type. During the subsequent steps of the conveyor wheel 2, the filled packages 3 pass to the weighing pan 4 of an electro-mechanical check weigher 5 of known construction. As shown in FIG. 3, the weighing pan 4 of the check weigher 5 is suspended on leaf springs 50, 51 and on a tension spring 53. The adjusting movement of the weighing pan 4 caused by a package 3 is measured by means of a stationary differential transformer 54 of that well-known type, the movable core 55 of which is connected with a vertical rod 56 of the weighing pan 4.

The displacement of the core 55 provoked during a weighing operation causes in the secondary winding of the differential transformer 54 a zero voltage to be produced at target or nominal weight, whereas in the case of under- or overweight an electrical impulse of corresponding magnitude and phase is produced in said secondary winding. These impulses are amplified in an amplifier and then, in a discriminator, are transmitted through a bridge circuit according to their magnitude and phase, to one of the relays 60 to 63 (FIG. 5) which form part of a classifier. In the case of faulty weights of the packages 3, the classifier effects, through a controlling circuit, an adjustment of the measuring and dispensing machine 1.

The relays 61 and 62 are provided for impulses indicating a weight which is still within an admissible tolerance range in the limit zones of such range. For underweights and overweights exceeding the admissible tolerance range, the relays 60 and 63 are provided.

When the differential transformer 54 produces a voltage impulse the magnitude and phase of which indicate an admissible underweight, the relay 61 is energized. This relay now closes its associated switch 64 thereby temporarily connecting a solenoid 7 with an A.C. line. In like manner, the relay 62 is energized by an impulse indicating an admissible overweight, whereby this relay through a switch 65 temporarily connects a solenoid 8 with the A.C. line.

The two solenoids 7 and 8 form part of a stepping switch or indexing mechanism of well-known type which is shown at an enlarged scale in FIG. 4. When one of the two solenoids 7 or 8 is energized, the respective solenoid with its armature 9, respectively 10 and a pawl 11, respectively 12, rotates ratchet wheel 13, respectively 14 through one tooth. The two ratchet wheels 13, 14 are each connected with a bevel gear 151, respectively 152, of a differential gear 15. The pinions 153, 154 of the differential gear 15 meshing with the bevel gears 151, 152 are supported on arms 156, 157 fixed to a bevel gear 155. This bevel gear 155 is rotatably mounted on a shaft 158 of the ratchet wheel 13 and meshes with a bevel gear 159 fastened on the output drive shaft 17.

On the output drive shaft 17 there are further mounted two cams 171, 172 the projections 173, 174 of which are set, in the zero position, at a predetermined selectable angle to the vertical. Arranged vertically above the cams 171, 172 and operatively associated with them are switching contacts 18, 19 which on the one hand are situated in the electric circuits of a reversing relay 20 of commercial type associated with an adjusting motor 21 of the dispensing machine 1, and on the other hand in the circuit of a time relay or timer 22.

When the solenoid 7 is energized, the output drive shaft 17 with the cams 171, 172 is rotated through a certain angle in the counter-clockwise direction through the differential gear 15, whereas it is rotated through a certain angle in the clockwise direction when the solenoid 8 is energized. If, for example, the solenoid 7 is energized several times in succession, which means that the dispensed quantities are in the lower tolerance range, the cam lobe 173 of cam 171 eventually reaches the vertical position whereby it closes the switching contact 18. Thereby the time relay 22 which is so designed that when being energized it closes two contacts 23, 24 for a predetermined period of time, is connected with the A.C. line. One of these contacts, i.e. contact 23, is situated in the circuits of the two relay windings 28, 29 of the reversing relay 20, and, when switching contact 18 is closed, is effective to keep the relay winding 29 energized during the preselected period of time and during this time switches on the adjusting motor 21. In this case, the respective rotation of the reversible adjusting motor 21 effects, through the intermediary of worm gearing 30, an increase of the measuring volume of the measuring and dispensing machine 1.

In like manner, the measuring volume of the machine 1 is reduced when, after a predetermined number of switching steps of the solenoid 8, the cam 172 closes the switching contact 19.

The second switching contact 24 of the time relay 22 is situated in the circuit of a solenoid 25 which when energized restores the drive shaft 17 to the zero position. To this end, a heart-shaped cam 27 is provided on the drive shaft 17, and the surface of this cam is in operative engagement with a rocking lever 26 connected with the armature of solenoid 25.

The effect of this control arrangement is that, for every impulse given by the switching contacts 18, 19, the dispensing machine is adjusted by an amount which is always the same and is dependent on the length of the period of time set by the time relay 22. If greater adjustment of the machine is necessary, for example due to sudden severe deviations in the specific weight of the charged material as might, inter alia, occur in the event of a change-over to another supply silo, the correction is carried out in a plurality of stages, that is to say the cam 171, respectively 172, will repeatedly give an adjusting impulse each time the preset number of faulty weights is reached, until the nominal or target weight is arrived at. Generally, however, only one correction step will be sufficient to restore this weight.

The number of faulty weights which is necessary to effect an adjustment of the dispensing volume depends on the preset angular movement of the cam lobes 173, 174 in relation to the vertical. Re-setting of the control mechanism to a different number of faulty weights is effected by loosening the set screws 175 in the hubs 176 of the cams 171, 172, turning the cams by a corresponding amount, and retightening the set screws 175.

For packages 3 the weight of which is above, respectively below, the admissible tolerance range, there is provided, on the station after the check weigher 5, an ejector 72 operated by a solenoid 70 through a lever 71. The electrical impulses which are produced when such underweight or overweight packages 3 are weighed on the check weigher 5, and which exceed a predetermined value, are transmitted by the discriminator also to the relays 60 and 63. These relays then connect a time-delay relay 73 with the A.C. line, and when the corresponding package 3 has arrived at the next station, this relay 73 energizes the solenoid 70, thereby causing the package to be ejected.

The embodiment illustrated in FIG. 2 indicates the adjusting mechanism, previously described, in conjunction with a continuously rotating dispensing machine of the kind described in the Palmer Patents Nos. 2,309,209 and 2,503,295. In this machine, the quantities of filling material are measured off in telescopic measuring chambers 81, 82 which are mounted on a rotating plate 80, whereupon they are discharged through hoppers 84 into packages 3 which are situated on a co-rotating conveyor device 83. In this embodiment, the weight of the filled packages 3 is checked during the feeding movement thereof. To this effect, the packages 3 travel over a conveyor belt 44 the upper portion of which is supported by the weighing plate 4' of the check weigher 5' which corresponds to the check weigher 5 of the embodiment shown in FIG. 3. The conveyor belt 44 passes over two rollers 45, 46 and is continuously driven by an electric motor 47.

The impulses provoked by the overweight or underweight packages in the check weigher 5' are transmitted, in the manner already described in connection with the embodiment according to FIGS. 1 and 3 to 5, through an amplifier, a discriminator, a classifier, and a controlling circuit, and a corresponding adjustment of the measuring machine shown in FIG. 2 is effected through the intermediary of the adjusting motor 21'. This is done by displacing the upper parts 81 of the measuring chambers, which are fixed to the plate 80, by a greater or lesser amount within the lower parts 82, by raising or lowering the plate 80. For this purpose, the plate 80 is suspended by means of a spindle 85 on a nut 86 which is rotatably supported in the stationary cover 87. Drivingly connected with the nut 86 is the output shaft 88 of the adjusting motor 21' which, depending on its direction of rotation, causes the plate 80 and the parts 81 to be raised or lowered.

What we claim is:

1. A package filling machine of the character described having volumetric measuring means, electromechanical weighing means and a count responsive mechanism operatively connected to said electromechanical weighing means for checking individually filled containers by weight and for automatically correcting the volumes dispensed by the machine on the basis of underweights or overweights; the count responsive mechanism comprising two electromagnets operatively connected to two pawl and ratchet indexing devices, a differential gear operatively connected to said indexing devices, a spindle operatively connected to said differential gear, cam means operatively connected to the spindle and switch means operatively connected to said cam means for energizing an associated electrical circuit for actuating the volumetric measuring means whereby the count responsive mechanism is operable in two directions to sum the negative and positive weight impulses corresponding to the underweights and overweights, respectively, and to thereby initiate a corresponding correction of the dispensing volume of the measuring means of the machine.

2. A filling machine according to claim 1 wherein the associated electrical circuit comprises a reversing relay electrically connected to the volumetric measuring means, a time relay electrically connected to the switch means, the time relay being electrically connected to the reversing relay, a contact mounted in the circuit between the time relay and the reversing relay whereby when the switch means is closed, the time relay is energized to close the contact for a predetermined period of time thereby energizing the reversing relay to effect actuation of the volumetric measuring means.

3. A filling machine according to claim 1 wherein said cam means comprises two discs, each disc having a lobe formed on the periphery thereof adapted to engage the switch means, said switch means being mounted above the discs in the same vertical plane therewith, said discs being adjustably mounted on the spindle whereby the disc lobes can be set at a selected angle relative to the switch means to thereby effect actuation of the volumetric measuring means at a predetermined angular movement of the cam means.

4. A filling machine according to claim 3 wherein the switch means comprises two contacts, each contact being engageable by a respective disc lobe, the contacts being electrically connected to the volumetric measuring means whereby when one of the disc lobes engages one of the contacts, the volume of the measuring means is increased and when the other disc lobe engages the other contact, the volume of the measuring means is decreased.

5. A filling machine according to claim 1 wherein package ejecting means is provided in proximity to the discharge end of the electromechanical weighing means, said ejecting means being operatively connected to the electromechanical weighing means whereby underweight or overweight packages exceeding a predetermined value can be ejected upon being discharged from the weighing means.

References Cited in the file of this patent

UNITED STATES PATENTS

| | | |
|---|---|---|
| 2,712,408 | Weber | July 5, 1955 |
| 2,781,975 | Pudelko et al. | Feb. 19, 1957 |
| 2,818,888 | Atwood et al. | Jan. 7, 1958 |